United States Patent [19]

Sawhill

[11] Patent Number: 4,729,896
[45] Date of Patent: Mar. 8, 1988

[54] BUFFERED ANIMAL FEED SUPPLEMENT BLOCK

[75] Inventor: J. Wallace Sawhill, Canoga Park, Calif.

[73] Assignee: Pacific Kenyon Corp., Long Beach, Calif.

[21] Appl. No.: 877,214

[22] Filed: Jun. 23, 1986

[51] Int. Cl.$^4$ .......................... A23K 1/04; A23K 1/22
[52] U.S. Cl. ........................................ 426/2; 426/69;
426/74; 426/623; 426/647; 426/807
[58] Field of Search ................... 426/2, 69, 74, 623,
426/630, 635, 807, 647; 424/127

[56] References Cited

U.S. PATENT DOCUMENTS 4,027,043 5/1977 Schroeder ........................ 426/69

OTHER PUBLICATIONS

Morrison, "Putting Research to Work", Feedstuffs, Dec. 13, 1976, pp. 36–38.
Jimenez, "Sodium Sesquicarbonate Effectiveness as an Alkalizer Tested", Feedstuffs, Jan. 28, 1985, pp. 20–21.

Primary Examiner—R. B. Penland
Attorney, Agent, or Firm—Robert E. Strauss

[57] ABSTRACT

A buffer containing, solid, animal feed supplement which has the proper hardness and palatibility to achieve a daily animal consumption of 0.2–0.5 pound of sodium carbonate or bicarbonate and 0.07–0.15 pound of magnesium oxide with free choice feeding. The feed supplement is a solidified mixture of various feed ingredients with a feed solution of sugars or proteins, and mixtures thereof. The supplement is solidified by sodium carbonate, or a mixture thereof, and magnesium oxide.

20 Claims, No Drawings

BUFFERED ANIMAL FEED SUPPLEMENT BLOCK

BACKGROUND OF THE INVENTION

1. Field of Invention

This invention relates to an animal feed supplement and, in particular, to a buffered feed supplement block for feeding to animals having high volume diets, particularly diets rich in grains.

2. Brief Statement of the Prior Art

Modern practices of feeding beef and dairy cattle include diets rich in grain at high levels of intake to achieve maximum production of milk from cows or gains in weight of beef cattle. Unfortunately, high grain diets cause sharp dips in the rumen pH shortly after ingestion of feed. The resultant fluctuations in rumen pH and the low pH values (about 5.5), disrupt activity of rumen microbes, particularly those which are sensitive to pH.

Prior investigators, e.g., Byers, Schelling and Coppock, Feedstuffs, Sept. 18, 1985, p. 18 report that buffering feed additives such as sodium bicarbonate or a mined ore, which is a mixture of sodium carbonate and bicarbonate, will favorably increase the digestability of high grain diets, although no significant improvements in weight gain or milk production were noted.

Kennelly and French, Univ. Alberta Feeders' Day Report, June 1985, reported that feedings of a diet containing buffers, such as sodium carbonate and magnesium oxide, twelve times a day measurably increased milk production over the same diet fed twice a day. It is also generally believed in the dairy industry that daily feeding of buffers such as one-third pound of sodium carbonate and one-tenth pound of magnesium oxide per cow in an otherwise adequate diet increases milk production by about 5 percent and butterfat content by about 3 percent.

In most dairy operations, there is no convenient method to feed the alkaline buffers. Many dairies feed a dry supplement mix which has barely acceptable palatibility. When buffers are added to the dry mix, the alkalinity of the buffers greatly reduces the palatability of the dry supplement mix, resulting in rejection by the animals.

Ideally, the buffers should be continually available to the animals and should have sufficient palatability that the animals will consume the proper quantities of the buffers by free-choice feeding. This would greatly simplify the feeding operation and would provide the animals with a continuous source of buffer, thus obtaining maximum effectiveness of the buffer.

Feed supplements have been manufactured and marketed as solid blocks which have been fed to cattle on a free-choice basis. A supplement in block form would be a convenient way of feeding buffers on a free-choice basis.

The earliest supplement blocks were pressed blocks which were formed by compressing mixtures of molasses and dry feed ingredients. Prior investigators have included hardening or setting agents in these pressed blocks. As an example, New Zealand specification No. 39247/72 suggests that any water soluble alkaline additive can be added as a setting agents.

Poured blocks, in which the ingredients are mixed with molasses and poured into cardboard cartons where they solidify, are more recent developments. The earliest commercial poured block was prepared by evaporative heating of the molasses similar to candy manufacturing as described in U.S. Pat. No. 3,961,081. This block lacked water resistance, and melted at elevated storage temperatures.

The most recent advances in supplement have been the poured chemical blocks, in which additives are used to gel molasses and form water-resistance solids. Large amounts of calcium oxide or magnesium oxide have been added to molasses and the mixtures have been heated to form solid supplements in the manner described in New Zealand Patent Specification No. 170,505.

Entirely chemically gelled and hardened poured blocks and their manufacture are described in U.S. Pat. Nos. 4,027,043, 4,160,041 and 4,431,675. These blocks are prepared by the reaction of molasses, a soluble phosphate and the oxide or soluble salt of calcium and/or magnesium. No heating is required and the liquid mixture is poured into cardboard cartons for solidification. Maximum hardness is attained by using both calcium and magnesium oxides.

Another method of manufacture of a poured block is described in U.S. Pat. Nos. 4,171,385 and 4,171,386 in which the molasses is gelled with clay which is added with high shear agitation. Magnesium oxide is added to the liquid mixture and the hardness of the block can be increased by the addition of ferrous sulfate, as described in U.S. Pat. No. 4,265,916.

The feed blocks which have been developed for free choice feeding of range cattle generally are far too hard for feeding to cows in a well managed dairy, or to beef cattle in a feed lot. Additionally, buffers such as sodium carbonate or bicarbonate cannot be readily added to these blocks without adversely affecting their quality. Well-fed cows or beef cattle will not consume a sufficient quantity of these blocks because of their hardness and/or lack of palatibility.

BRIEF STATEMENT OF THE INVENTION

This invention comprises a buffer-containing, solid, animal feed supplement which has the proper hardness and palatability to achieve a daily animal consumption of 0.2–0.5 pound of sodium carbonate or bicarbonate and 0.07–0.15 pound of magnesium oxide with free choice feeding. The feed supplement is a solidified mixture of various feed ingredients with a feed solution of sugars or proteins, and mixtures thereof. The supplement is solidified by sodium carbonate, bicarbonate, or a mixture thereof, and magnesium oxide. The latter additives thus serve the dual purposes of solidifying the feed supplement and providing the desired buffer for the animal. The concentration of these additives is from 8 to 25 weight percent sodium carbonate, bicarbonate, or mixtures thereof, and from 2 to about 5 weight percent magnesium oxide. Other feed ingredients can also be included, such as from 1 to about 35 weight percent natural protein feeds or equivalent proteins such as urea, biurea and ammonium salts. Fat from either animal or plant sources can be included in an amount from 1 to about 20 weight percent. Calcium and/or phosphorus additives can be included such as calcium carbonate, dicalcium phosphate, defluorinated phosphate rock, etc., in amounts sufficient to provide from 0.5 to 1.5 weight percent calcium and from 0.5 to 1.5 weight percent phosphorus in the final product. Vitamins and trace minerals can also be included.

When the buffered supplement block is provided to animals which are not fed a high volume grain and forage diet, it may be necessary to increase the hardness of the block to limit consumption. The hardness of the block can be adjusted to any desired value by the inclusion of either, or both, phosphoric acid and lime (or calcium hydroxide) in amounts from 0.5 to 5 weight percent, each.

The feed supplement block used for practice of this invention, in general, has the composition set forth in the following table:

TABLE 1

| Ingredient | Concentration in Final Product (Weight Percent) | |
| --- | --- | --- |
| | Broad | Preferred |
| Feed Solution | 30–90 | 50–80 |
| Sodium carbonate[1] | 8–25 | 12–18 |
| Magnesium oxide | 2–5 | 3.5–5 |
| Protein or non-protein nitrogen[2] | 1–35 | 5–20 |
| Fat | 1–20 | 2–8 |
| Vitamins | 0–3 | 0.1–2 |
| Minerals | 0–4 | 0.1–2 |
| Phosphorus source | 0–8 | 1–3 |
| Calcium source | 0–8 | 1–3 |
| Hardening agents[3] | 0–10 | 0–6 |

[1]sodium carbonate, bicarbonate, or mixture thereof
[2]expressed as equivalent protein
[3]calcium oxide or hydroxide, and/or phosphoric acid These supplements contain from 10 to 35 percent water, preferably from 15 to 28 percent water. Water is a component of the above ingredients such as the feed solutions. Where necessary, water can also be added as an ingredient to obtain the desired water content in the final supplement.

The content of minerals, phosphorus and calcium, as well as other ingredients such as drugs, vitamins, etc., can be varied as desired for specific applications. Examples of various minerals are manganese, iodine, zinc, copper, cobalt and iron compounds. In some specific applications, a high content mineral supplement is desirable, e.g., containing from 6 to 10 weight percent phosphorus, 5 to 8 weight percent calcium and from 0.1 to 2 weight percent of mineral salts, added as finely divided powders. These salts can be water insoluble salts such as dicalcium and tricalcium phosphate or can be water soluble salts such as monoammonium phosphate. Examples of vitamins include Vitamin A, Vitamin D, and Vitamin E. Niacin, a B-complex vitamin can also be included, particularly in a dairy block, as it is known to increase milk production and butterfat content.

Examples of useful drugs are: growth promoting food additives or drugs such as monensin and sodium monensin, commercially available under the designation Rumensin from Eli Lilly Co.; aureomycin, terramycin, chlorotetracyline and sulfamethiazine; and mixtures of chlorotretracyline and sulfamethiazine; etc. Other useful drugs include antibloat and antihelmintic agents as well as insect control agents. Methionine hydroxy analog or DL-Methionine can also be included in a dairy supplement block to improve dry matter intake, reduce sub-clinical ketosis and improve butterfat content. Active dry yeast (asperoillus oryzae culture) can be included in a dairy block to increase milk production. The aforementioned materials are used in effective concentrations for the desired result, e.g., drugs are used at concentrations from 0.5 to about 1.0 weight percent. The minerals are usually used in similar concentrations, but are often expressed in amounts from 3 to about 500 milligrams per pound and vitamins are frequently expressed from 10 to about 50,000 units per pound.

THE FEED SOLUTION

The animal feed supplement block is prepared from a commercial aqueous feed solution. Generally, this will be a sugar solution, and a variety of sugar solutions can be used; however, molasses is a preferred source. The feed solution should be present in the feed supplement at a concentration of from 30 to about 95, preferably from 50 to about 80, weight percent. The preferred molasses source is commercially available with a sugar content from about 65 to 85 Brix and a consistency that varies from a thin to a thick syrup. The water content of these solutions is from 5 to about 30 weight percent. The molasses can be any sugar containing molasses such as cane or Blackstrap Molasses, beet molasses, converted molasses wood sugar molasses, hydrosyrup, citrus molasses and the like.

Another sugar solution that can be used is whey, a by-product of the dairy industry. The whey is a dilute solution of lactoalbumin, lactose, some fats, and the soluble inorganics from the parent milk. This whey solution is condensed and spray dried to a powder or is condensed to about 40 to 60 percent solids and preserved. A typical analysis is as follows:

TABLE 3

| Composition of a Typical Dried Whey | |
| --- | --- |
| Protein | 12.0% |
| Fat | 0.7% |
| Lactose | 60.0% |
| Phosphorous | 0.79% |
| Calcium | 0.87% |
| Ash | 9.7% |

A third source of a useful sugar solution is the pulp and paper industry which produces large quantities of by-product lignin sulfonates from wood during the sulfite pulping process. After the separation of lignin, the acidity of the resultant solution is neutralized with an ammonium or alkali metal bisulfite compound or base to form the following organic salts:

Ammonium lignin sulfonate;
Sodium lignin sulfonate; and
Magnesium lignin sulfonate.

A typical analysis of a commercially available ammonium lignin sulfonate solution is as follows:

TABLE 4

| Typical Analysis of Ammonium Lignin Sulfonate | |
| --- | --- |
| Percent Solids | 50% |
| Specific gravity | 1.237 |
| pH, 10% solution | 3.5 |
| Sugars - expressed as glucose | 16.0% |
| Tannin content | 45.0% |
| Available ammonia | 3.0% |
| Sulfur | 6.0% |
| Ash | 1.0% |

The sugar solution is the energy source ingredient of the supplement. Sources of other metabolizable organic values can be used to replace a portion of the sugar solutions. Examples of such other useful energy ingredients sources include condensed and dehydrated molasses solubles which are obtained from the fermentation of molasses to produce chemicals such as ethanol, citric acid, glutamic acid, etc. A material rich in metabolizable values, known as condensed molasses solubles, is obtained by evaporation of the residue from this fermentation. This material can also be dehydrated to dryness and the resultant dry solid is also a useful additive. Another very useful feed solution is a condensed or concentrated fermented corn extract, which is sometimes referred to as corn steep liquor or mazoferm. This material is obtained by concentrating the liquid remaining after steeping corn in an aqueous sulfur dioxide solution and allowing it to ferment. These materials can have from 40 to 90 percent solids (the balance being water) and can contain, on a dry weight basis, from 1 to 15 percent sugar and contain significant contents of protein, e.g., from 5 to about 25 percent. All, or any portion, of the aforementioned sugar solutions can be replaced with these feed solutions, depending on the amount of natural protein which is desired in the final supplement.

THE BUFFER INGREDIENTS

The buffer ingredients, which also serve to solidify the feed supplement, are sodium carbonate, sodium bicarbonate and mixtures thereof, and magnesium oxide. The carbonate is the preferred carbonate source as it is readily available and less costly than the bicarbonate. Also, the alkaline carbonate neutralizes the acids commonly present in molasses and is thereby converted to a mixture of bicarbonate and carbonate. Other sources of the buffer include sodium sesquicarbonate, which is a hydrated carbonate and bicarbonate double salt. Carbonate ores such as trona ore, which can contain up to 25 weight percent impurities, can also be used provided they are of sufficient concentration and do not contain any toxic impurities. The carbonate/bicarbonate ingredient is used in an amount from 8 to 25, preferably from 12 to 18, weight percent of the supplement.

The second buffer ingredient which can be used is magnesium oxide. Preferably the magnesium oxide has a moderate to high reactivity, as measured by the time required to neutralize a standard citric acid solution. Acceptable magnesium oxides exhibit neutralization times in this standard test which are from 10 to about 150 seconds, preferably from 10 to about 90 seconds. The magnesium oxide can be used in an amount from 2 to 5, preferably from 3.5 to 5, weight percent of the supplement. It is also preferred that the weight proportion of magnesium oxide to the carbonate/bicarbonate be from ¼ to ½, preferably about ⅓. When used in these proportions, the buffer ingredients have the most desirable pH value, and are the most effective as a rummen buffer.

THE PHOSPHATE AND CALCIUM INGREDIENTS

When the supplement blocks are free-choice fed to animals on a high volume diet, their hardness as measured by a laboratory durometer should be about 20 to 45 units. When the supplement should also contain dietary amounts of phosphorus and/or calcium, suitable sources are dicalcium phosphate, defluorinated phosphate rock, calcium carbonate, gypsum, etc., all having limited water solubility. When the blocks should have a hardness of 60 units or greater (as may be required when fed to animals on low to moderate volume diets which would overconsume the softer block), water soluble and reactive sources of phosphate and/or calcium can be used as hardening additives.

The phosphates which can be employed as hardening agents in the feed supplement block can be phosphoric acid or any soluble salt thereof, with the acid being preferred. Examples of useful phosphates include the alkali metal and ammonium salts, e.g., sodium phosphate, potassium phosphate, or ammonium phosphate. The preferred hardening agent is phosphoric acid which can be of any commercially available grade from 50 to 98 percent acid. When necessary to increase hardness, the phosphate is employed in the supplement at a concentration from about 0.5 to about 5.0, preferably from 0.5 to about 3.0 weight percent, expressed as $P_2O_5$.

Calcium sources which can be used as hardening agents can be calcium oxide or hydroxide. Commercially available lime, calcium oxide, is useful in finely subdivided form, typically 90 weight percent or more passing a 125 mesh screen. The more finely subdivided the lime, the faster that it will hydrate and participate in the solidification of the supplement. The lime can be slaked by mixing with water prior to addition to the sugar solution, or if desired, can be added directly to the aqueous sugar solution, depending on the process equipment and controls. When necessary to increase hardness, the amount of the calcium oxide or hydroxide ingredient which is employed can be from 0.5 to about 5.0 weight percent, expressed as the oxide, and preferably is from about 0.5 to about 3.0 weight percent based on the weight of the sugar solution.

THE PROTEIN SOURCE

The feed supplement block can also contain a nitrogen source for the animal's protein requirements. Generally the protein content of the feed supplement block will be from 1 to 35, preferably from 5 to 20, weight percent. The nitrogen can be in proteins which are commonly found in various sources such as: dried blood and meat meal from rendering plants, cottonseed meal, soy meal, rape seed meal, sunflower seed meal, dehydrated alfalfa, dried and sterilized animal and poultry manure, fish meal, liquid or powdered egg, fish solubles, cell cream and rabbit pellets. Some or all of the protein can be "by-pass" protein, such as corn gluten meal, blood meal, feather meal, dried brewer's grains, distiller's dried grains, etc. All, or any portion of the protein can be "by-pass" protein.

When the feed supplement is intended for consumption by ruminants, a non-protein nitrogen compound such as ammoniacal compounds, e.g., urea, biuret or mono- or di- ammonium phosphates can be used to supplement the protein requirements. Although the NPN ingredient can be from 0 to 90 percent of the total protein of the supplement, it is preferred to limit the amount of this ingredient to a maximum content of 10 to 35 percent of the total protein. The preferred non-protein nitrogen source is urea which can be added in an amount from 2 to about 15 weight percent, preferably from 5 to 12 weight percent, based on the supplement. In some applications, it is preferred to use all "natural" protein, and in such instances, a vegetable meal such as cottonseed meal, soy meal, rape seed meal, corn gluten meal, blood meal, feather meal, etc. can be used.

The following examples illustrate practice of the invention and will serve to demonstrate results obtainable therewith. In the examples, molasses of commercial quality (79.5 Brix) is used, and the reported data contain the quantity of carbonate or bicarbonate added. After mixing, these ingredients form the sesquicarbonate, a dihydrate, and thereby increase slightly in concentration in the final product.

EXAMPLE 1

Buffer-containing feed supplement samples are prepared by mixing together the following ingredients:

| Ingredient | Content (Weight Parts) | | | | |
|---|---|---|---|---|---|
| | No. 1 | No. 2 | No. 3 | No. 4 | No. 5 |
| 1. Molasses | 470 | 470 | 470 | 470 | 470 |
| 2. Urea | 20 | 20 | 20 | 20 | 20 |
| 3. Water | 100 | 100 | 100 | 100 | 100 |
| 4. Sodium Carbonate | 150 | — | — | — | 150 |
| 5. Sodium Sesquicarbonate | — | 150 | — | — | — |
| 6. Sodium Bicarbonate | — | — | 150 | — | — |
| 7. Magnesium oxide | 50 | 50 | 50 | 50 | — |
| 8. Corn gluten | 80 | 80 | 80 | 80 | 80 |
| 9. Feather meal | 50 | 50 | 50 | 50 | 50 |
| 10. Dicalcium phosphate | 50 | 50 | 50 | 50 | 50 |
| 11. Fat (soy oil) | 30 | 30 | 30 | 30 | 30 |

The supplements are prepared by stirring the mixture of molasses, water and urea and adding the selected carbonate buffer (Ingredient 4, 5 or 6) while continuing to stir the mixture. After the carbonate is completely dispersed, the magnesium oxide is added and the mixture is stirred. The remaining ingredients are then added, the mixture is stirred to disperse these ingredients, and the liquid mixture is poured into small cardboard boxes.

All of the mixing of the ingredients is done at ambient temperature (70° F.). A slight increase in temperature is observed and the temperatures of the final mixure, before pouring, are also recorded and presented below. The boxes are placed in a laboratory oven maintained at 120° F. to simulate the temperature expected in plant practice of the invention.

After 24 hours, the samples are removed from the oven and the following hardness values are observed, when measuring the surface hardness with a durometer having a small diameter pin:

| | No. 1 | No. 2 | No. 3 | No. 4 | No. 5 |
|---|---|---|---|---|---|
| Pour Temperature (°F.) | 108 | 106 | 100 | 90 | 86 |
| Hardness | 60 | 40 | 20 | 12 | <2 |

Samples 4 and 5 were too soft for application as even well-fed cattle would be expected to overconsume supplement blocks having these hardness values. These blocks were sufficiently soft that one could easily push one's fingers into the product.

Sample 2 had acceptable hardness for free choice feeding. Sample 1 would be acceptable, however, it may have limited consumption if fed to animals on a high volume diet of other feeds. Sample No. 3 would be marginally acceptable, however, over-consumption could be expected in many applications.

The direct relationship between hardness and percent of the carbonate added as bicarbonate, which is apparent from a comparison of Samples 1-3, provides a control useful for final adjustment of the hardness to fit a particular feeding situation. Thus, if the animals do not consume sufficient quantities of the block formulated with sodium carbonate as sample No. 1, some of the sodium carbonate can be replaced with sodium bicarbonate, softening the block.

EXAMPLE 2

The procedure of Example 1 was repeated to prepare seven additional samples. These samples had the following compositions:

| Ingredient | Content (Weight Parts) | | | | | | |
|---|---|---|---|---|---|---|---|
| | No. 7 | No. 8 | No. 9 | No. 10 | No. 11 | No. 12 | No. 13 |
| Molasses | 470 | 470 | 470 | 470 | 470 | 470 | 470 |
| Water | 100 | 100 | 100 | 100 | 100 | 100 | 100 |
| Urea | 20 | 20 | 20 | 20 | 20 | 20 | 20 |
| Sodium carbonate | 150 | 150 | 100 | 100 | 75 | 75 | 50 |
| Magnesium oxide | 40 | 30 | 50 | 35 | 50 | 25 | 30 |
| Di Calcium phosphate | 50 | 50 | 50 | 50 | 50 | 50 | 50 |
| Corn gluten | 80 | 80 | 80 | 80 | 80 | 80 | 80 |
| Feather meal | 50 | 50 | 50 | 50 | 50 | 50 | 50 |
| Fat | 30 | 30 | 30 | 30 | 30 | 30 | 30 |

The pour temperatures, contents of sodium carbonate and magnesium oxide, and the hardness values of the blocks after 24 hours storage at 120° F. are as follows:

| Sample | No. 7 | No. 8 | No. 9 | No. 10 | No. 11 | No. 12 | No. 13 |
|---|---|---|---|---|---|---|---|
| Pour temperature, °F.: | 95 | 96 | 103 | 106 | 96 | 93 | 92 |
| Sodium Carbonate | 15 | 15 | 10 | 10 | 7.5 | 7.5 | 5 |
| Magnesium oxide | 4 | 3 | 5 | 3.5 | 5 | 2.5 | 3 |
| Hardness | 40 | 30 | 40 | 20 | 25 | <2 | <2 |

Samples 12 and 13 are unacceptable, and samples 10 and 11 are marginally acceptable for free choice feeding.

EXAMPLE 3

The procedure was repeated with the formulation of Sample No. 13, however, limited amounts of lime and phosphoric acid were included. The formulation was as follows:

| Ingredient | Content (Weight Parts) No. 14 |
|---|---|
| water | 100 |
| lime | 10 |
| molasses | 470 |
| urea | 20 |
| phosphoric acid | 20 |
| sodium carbonate | 50 |
| magnesium oxide | 30 |
| corn gluten | 80 |
| feather meal | 50 |
| dicalcium phosphate | 50 |
| fat | 30 |

The water and lime are mixed to hydrate the lime, and the molasses and urea are then added. After these ingredients are mixed by stirring, the phosphoric acid is added and after it is neutralized, sodium carbonate is added and the mixture is stirred. Magnesium oxide is then added. After stirring the magnesium oxide into the liquid, the remaining ingredients are added. The pour temperature of the liquid is 106° F.

After 24 hours at 120° F. the laboratory sample is inspected and observed to have a hardness value of 20, thus indicating that the lime and phosphoric acid significantly increased the hardness from that observed for sample No. 13.

EXAMPLE 4

A feed supplement is produced in commercial quantities in a commercial plant mixer. The following ingredients are mixed into the supplement:

| Ingredient | Content (Weight Percent) |
| --- | --- |
| Water | 10.0 |
| Molasses | 47.6 |
| Urea | 1.3 |
| Sodium Carbonate | 15.0 |
| Magnesium Oxide | 5.5 |
| Corn gluten | 8.0 |
| Feather meal | 5.0 |
| Dicalcium phosphate | 5.0 |
| Fat (Soy oil) | 2.5 |
| Vitamin mix | 1.0 |
| The formulation provided the following nutrients: | |
| Crude Protein | 14.0 |
| NPN not more than | 3.8 |
| Calcium | 1.2 |
| Phosphorus | 1.1 |
| Carbonate buffer* | 17.0 |
| Magnesium oxide | 5.5 |
| Fat | 2.5 |

*a mixture of carbonate-bicarbonate hydrated salt

The ingredients were mixed in a plant batch mixer using the procedure of addition of Example 1. After all the ingredients had been added, the temperature of the final mixture was 102° F. The mixture was poured into 250-pound capacity cardboard tubs, covered and moved into a warehouse. During storage ovrnight, the temperature of the supplement mixture in the tubs reached a maximum value of 165° F. After overnight storage, the tubs were inspected and found to have a hardness of 35.

The resultant blocks were fed, free-choice, to a test group of high producing Holstein cows, milked three times daily and on a full feeding program. Six pens of cows were provided with the supplement block; one pen contained 80–90 fresh cows; another pen contained 100 cows with at least 100 days in lactation; three pens contained 78 mature milking cows each; and two pens contained 78 first-calf-heifers each. A wooden fruit bin 4 feet × 4 feet and 3 feet high was placed in each pen and four to five supplement blocks were placed in each bin, and replenished as consumed.

The cows consumed the supplement blocks at a rate adequate to supply from 0.2 to 0.3 pounds of the buffer ingredients per day to each cow. The lowest consumption was by the fresh cows which consumed the block at an average rate of 0.84 pounds per head per day. This was expected, as during the progress of the test cows were moved from this pen to the other test pens, and fresh cows, unfamiliar with the supplement, were added to the fresh cow pen. The three pens of mature cows consumed the supplement block at a rate of 1.44 pounds per head per day; the pen of 100-lactation-day cows consumed the supplement block at the rate of 1.36 pounds per head per day, and the cows in the remaining pens consumed the supplement blck at a rate of 1.21 pounds per head per day. The feeding test was continued for one month.

Since the cows were under a full feeding program with an average of eight feedings per day of silage, hay and grain, it was not expected that they would consume the block at the necessary rate of about 1.2 to 1.6 pounds per head per day. Contrary to expectations, the aforementioned consumption rate was unexpectedly high and was sufficient to supply the cows with the necessary quantity of buffers. The daily feeding regimen was as follows:

| Time | Ration | Quantity per head |
| --- | --- | --- |
| 0600–0630 | grain mix | 12.5 pounds |
| | corn silage | 15.0 pounds |
| 0730–1200 | alfalfa | 4.5 pounds |
| 1400–1700 | grain mix | 12.5 pounds |
| | corn silage | 15.0 pounds |
| 2100 | alfalfa | 4.5 pounds |
| | silage | to excess of consumption |

The grain mix contained cottonseed meal, whole cottonseed, shredded beet pulp, wet corn gluten, liquid supplement and mineral mix.

In addition to the above feedings, the cows were also fed a total of 10 pounds of steam rolled barley, consumed during the three milkings each day. The average daily consumption of these feeds was 79 pounds per cow per day.

The formulation and hardness of the suppement block provided the proper palatability to insure adequate consumption on a free-choice basis under the most critical situation, i.e., with cows which were fed all they could eat of other feeds.

The invention has been described with reference to the presently preferred and illustrated embodiments. It is not intended that the invention be unduly limited by the disclosure of the preferred embodiments. Instead, it is intended that the invention be defined by the method steps, and ingredients, and their obvious equivalents set forth in the following claims:

I claim:
1. A method of feeding ruminants which comprises:
   (a) preparing a solid feed supplement in block form having a total water content from 10 to 35 weight percent and consisting essentially of from 30 to 95 weight percent of a feed solution containing 40 to 95 percent solids of sugar, protein, or mixtures thereof and, solidifying and buffering ingredients consisting essentially of sodium carbonate, sodium bicarbonate, and mixtures thereof in an amount from 8 to 25 weight percent of said supplement, and from 2 to 5 weight percent magnesium oxide of said supplement;
   (b) feeding said solid feed supplement to the ruminant for free choice consumption; and
   (c) controlling the free choice consumption of the feed supplement at a level from 1 to about 4 pounds per day by maintaining the quantities of said solidifying and buffering ingredients at the amounts sufficient to impart a preselected hardness to said solid feed supplement.

2. The method of claim 1 including the step of incorporating from 3.5 to 5 weight percent magnesium oxide in said supplement.

3. The method of claim 1 wherein said sodium carbonate, sodium bicarbonate or mixtures thereof are added in an amount from 12 to 18 weight percent of said supplement.

4. The method of claim 1 wherein a mixture of sodium carbonate and sodium bicarbonate is added in proportions from about 4/1 to ¼ weight parts carbonate to bicarbonate, and said step of controlling the consumption of the feed supplement is practiced by adjusting the proportions of carbonate to bicarbonate which is added to said feed solution.

5. The method of claim 1 including the step of incorporating a protein source in said feed supplement solid in an amount from 1 to 35 weight percent, expressed as protein.

6. The method of claim 5 wherein said protein source contains non-protein nitrogen in an amount no greater than 90 weight percent of said protein source, expressed as equivalent protein.

7. The method of claim 5 wherein said protein source comprises ruminant by-pass protein.

8. The method of claim 7 wherein said by-pass protein is feather meal.

9. The method of claim 7 wherein said by-pass protein is blood meal.

10. The method of claim 7 wherein said by-pass protein is a mixture of corn gluten meal and feather meal.

11. A water resistant, solid, animal feed supplement in block form containing from 10 to 35 weight percent water, and consisting essentially of:
   (a) from 30 to 90 percent of an aqueous syrup containing from 40 to 95 percent solids comprising a feed nutrient selected from the group consisting of sugar, protein, and mixtures thereof; and
   (b) solidifying and buffering ingredients consisting essentially of:
      (i) from 2 to 5 weight percent magnesium oxide; and
      (ii) from 8 to 25 weight percent of sodium carbonate, bicarbonate, or mixtures thereof, whereby said supplement has sufficient hardness to permit free choice feeding.

12. The feed supplement of claim 11 wherein said magnesium oxide is added to said supplement in an amount from 3 to 5 weight percent.

13. The feed supplement of claim 11 wherein said sodium carbonate, sodium bicarbonate or mixtures thereof are added in an amount from 12 to 18 weight percent of said supplement.

14. The feed supplement of claim 11 wherein a mixture of sodium carbonate and sodium bicarbonate is added to said supplement in proportions from about 4/1 to ¼ weight parts carbonate to bicarbonate.

15. The feed supplement of claim 14 wherein said protein source contains non-protein nitrogen in an amount no greater than 90 weight percent of said protein source, expressed as equivalent protein.

16. The feed supplement of claim 11 wherein a protein source is added to said feed supplement solid in an amount from 1 to 35 weight percent, expressed as protein.

17. The feed supplement of claim 15 wherein said protein source comprises a ruminant by-pass protein.

18. The feed supplement of claim 17 wherein said by-pass protein is feather meal.

19. The feed supplement of claim 17 wherein said by-pass protein is blood meal.

20. The feed supplement of claim 17 wherein said by-pass protein is a mixture of corn gluten meal and feather meal.

* * * * *